United States Patent
Avery et al.

(10) Patent No.: US 10,171,333 B2
(45) Date of Patent: Jan. 1, 2019

(54) DETERMINING CONNECTION FEASIBILITY AND SELECTION BETWEEN DIFFERENT CONNECTION TYPES

(71) Applicant: International Business Machines Corporation, Armonk, NY (US)

(72) Inventors: Kenytt D. Avery, Newport Beach, CA (US); Edward L. Bader, Los Angeles, CA (US); Patricia V. Gatewood, Costa Mesa, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 606 days.

(21) Appl. No.: 14/618,770

(22) Filed: Feb. 10, 2015

(65) Prior Publication Data
US 2016/0234092 A1    Aug. 11, 2016

(51) Int. Cl.
*H04L 12/26* (2006.01)
*H04L 12/725* (2013.01)
(Continued)

(52) U.S. Cl.
CPC .......... *H04L 43/16* (2013.01); *H04L 12/5692* (2013.01); *H04L 41/5009* (2013.01);
(Continued)

(58) Field of Classification Search
CPC . H04L 43/16; H04L 12/5692; H04L 41/5009; H04L 69/329; H04L 43/0864
See application file for complete search history.

(56) References Cited

U.S. PATENT DOCUMENTS 5,127,048 A * 6/1992 Press ................. H04N 1/00206
358/442
6,260,057 B1 * 7/2001 Eykholt ................... G06F 9/44
712/E9.082
(Continued)

FOREIGN PATENT DOCUMENTS

WO    2013126524 A1    8/2013

OTHER PUBLICATIONS

Swarup Mohalik, et al., Model Checking based Analysis of End-to-end Latency in Embedded, Real-time Systems with Clock Drifts, In Proceedings of the 45th Annual Design Automation Conference (DAC '08), 2008, pp. 296-299, ACM/IEEE, Anaheim, CA, USA.
(Continued)

*Primary Examiner* — Michael A Keller
*Assistant Examiner* — Javier O Guzman
(74) *Attorney, Agent, or Firm* — Lee Law, PLLC; Christopher B. Lee

(57) ABSTRACT

Application-level connection pre-testing of an available connection type of a number of different available connection types is performed by an application executed by a processor programmed to use the different available connection types and a number of different available service interfaces. Application-accessible performance characteristics of the available connection type are measured by the application. A determination is made as to whether the measured application-accessible performance characteristics of the available connection type satisfy a threshold application-level connection performance criterion specified in accordance with a service-level data transmission formatting option utilized by one of the different available service interfaces. The available connection type is selected in response to determining that the application-accessible performance characteristics of the available connection type
(Continued)

satisfy the threshold application-level connection performance criterion specified in accordance with the service-level data transmission formatting option utilized by the one of the different available service interfaces.

18 Claims, 4 Drawing Sheets

(51) Int. Cl.
  *H04L 12/54* (2013.01)
  *H04L 12/24* (2006.01)
  *H04L 12/08* (2006.01)
  *H04L 29/08* (2006.01)

(52) U.S. Cl.
  CPC ........ *H04L 43/0864* (2013.01); *H04L 45/306* (2013.01); *H04L 69/329* (2013.01)

(56) References Cited

U.S. PATENT DOCUMENTS

| | | | |
|---|---|---|---|
| 6,522,987 B1* | 2/2003 | Flink | H04L 12/2801 702/107 |
| 7,155,215 B1* | 12/2006 | Miernik | H04L 41/5009 455/423 |
| 7,213,766 B2* | 5/2007 | Ryan | G06F 13/385 235/472.02 |
| 7,411,915 B1* | 8/2008 | Spain | H04L 41/0806 370/250 |
| 7,561,517 B2 | 7/2009 | Klinker et al. | |
| 8,341,291 B2 | 12/2012 | Twitchell, Jr. | |
| 8,374,089 B2 | 2/2013 | Tanaka et al. | |
| 8,510,468 B2 | 8/2013 | Vange et al. | |
| 8,660,545 B1* | 2/2014 | Redford | H04W 4/001 348/552 |
| 9,128,751 B2* | 9/2015 | Tokashiki | G06F 9/4843 |
| 9,350,595 B1* | 5/2016 | Yadav | H04L 29/06027 |
| 9,359,595 B2* | 6/2016 | Tark | C12N 7/00 |
| 2002/0071436 A1 | 6/2002 | Border et al. | |
| 2002/0184269 A1* | 12/2002 | Imagou | G06F 17/30569 715/229 |
| 2003/0073406 A1* | 4/2003 | Benjamin | G08G 1/0962 455/41.1 |
| 2003/0097442 A1* | 5/2003 | Farhat | H04L 12/5691 709/224 |
| 2005/0091355 A1* | 4/2005 | Keohane | H04L 63/0428 709/223 |
| 2005/0254435 A1* | 11/2005 | Moakley | H04L 67/16 370/252 |
| 2006/0265716 A1* | 11/2006 | Claussen | G06F 9/4435 719/315 |
| 2007/0162466 A1* | 7/2007 | Claussen | G06F 17/2247 |
| 2008/0081606 A1 | 4/2008 | Cole | |
| 2008/0205271 A1* | 8/2008 | Aissaoui | H04L 12/66 370/235 |
| 2010/0153969 A1 | 6/2010 | Dyba et al. | |
| 2011/0264819 A1* | 10/2011 | Srinivasan | H04L 12/6418 709/231 |
| 2012/0122461 A1* | 5/2012 | Hossain | H04W 72/085 455/450 |
| 2012/0196644 A1* | 8/2012 | Scherzer | H04W 72/02 455/524 |
| 2012/0329445 A1* | 12/2012 | Elliott | H04W 4/008 455/420 |
| 2013/0054751 A1 | 2/2013 | Ponsford et al. | |
| 2013/0322329 A1* | 12/2013 | Visuri | H04W 48/16 370/328 |
| 2014/0006919 A1* | 1/2014 | He | G06F 17/241 715/230 |
| 2014/0351444 A1* | 11/2014 | Qi | H04L 67/16 709/227 |
| 2015/0188791 A1* | 7/2015 | Wyld | H04L 43/0805 709/224 |
| 2015/0207686 A1* | 7/2015 | Raleigh | H04L 41/0893 370/329 |
| 2015/0370520 A1* | 12/2015 | Durlach | G06F 3/14 348/488 |
| 2017/0127460 A1* | 5/2017 | Chandramouli | H04W 4/70 |

OTHER PUBLICATIONS

Bruce Lowekamp, et al., A Resource Query Interface for Network-Aware Applications, In Proceedings of the 7th International Symposium on High Performance Distributed Computing, 1998, pp. 189-196, IEEE, Chicago, IL, USA.

Robert L. Carter, et al., Server Selection using Dynamic Path Characterization in Wide-Area Networks, In Proceedings of IEEE INFOCOM, 16th Annual Joint Conference of the IEEE Computer and Communications Societies, Apr. 1997, pp. 1-8, IEEE, Kobe, Japan.

Larry L. Peterson, et al., Computer Networks: a systems approach, Fifth Edition, Book, 2012, pp. 44-50, 262-263, 534, 765-767 (plus title and index pages), Morgan Kaufmann Publishers for Elsevier, Inc., Burlington, MA, USA.

* cited by examiner

DETERMINING CONNECTION FEASIBILITY AND SELECTION BETWEEN DIFFERENT CONNECTION TYPES

BACKGROUND

The present invention relates to connectivity configuration and selection. More particularly, the present invention relates to determining connection feasibility and selection between different connection types.

Computing devices may execute applications usable by a user to perform certain activities, such as bookkeeping, drafting, or other types of activities. Data generated by the computing devices may be stored on the respective computing devices or may be stored remotely, such as on a server or within a database.

BRIEF SUMMARY

A method includes: performing, by an application executed by a processor and programmed to use a plurality of different available connection types and service interfaces, application-level connection pre-testing of an available connection type of the plurality of different available connection types; measuring, by the application, application-accessible performance characteristics of the available connection type of the plurality of different available connection types; determining whether the measured application-accessible performance characteristics of the available connection type satisfy a threshold application-level connection performance criterion specified in accordance with a service-level data transmission formatting option utilized by one of the different available service interfaces; and selecting the available connection type in response to determining that the application-accessible performance characteristics of the available connection type satisfy the threshold application-level connection performance criterion specified in accordance with the service-level data transmission formatting option utilized by the one of the different available service interfaces.

A system that performs the method and a computer program product that causes a computer to perform the method are also described.

DETAILED DESCRIPTION

Figure 1:
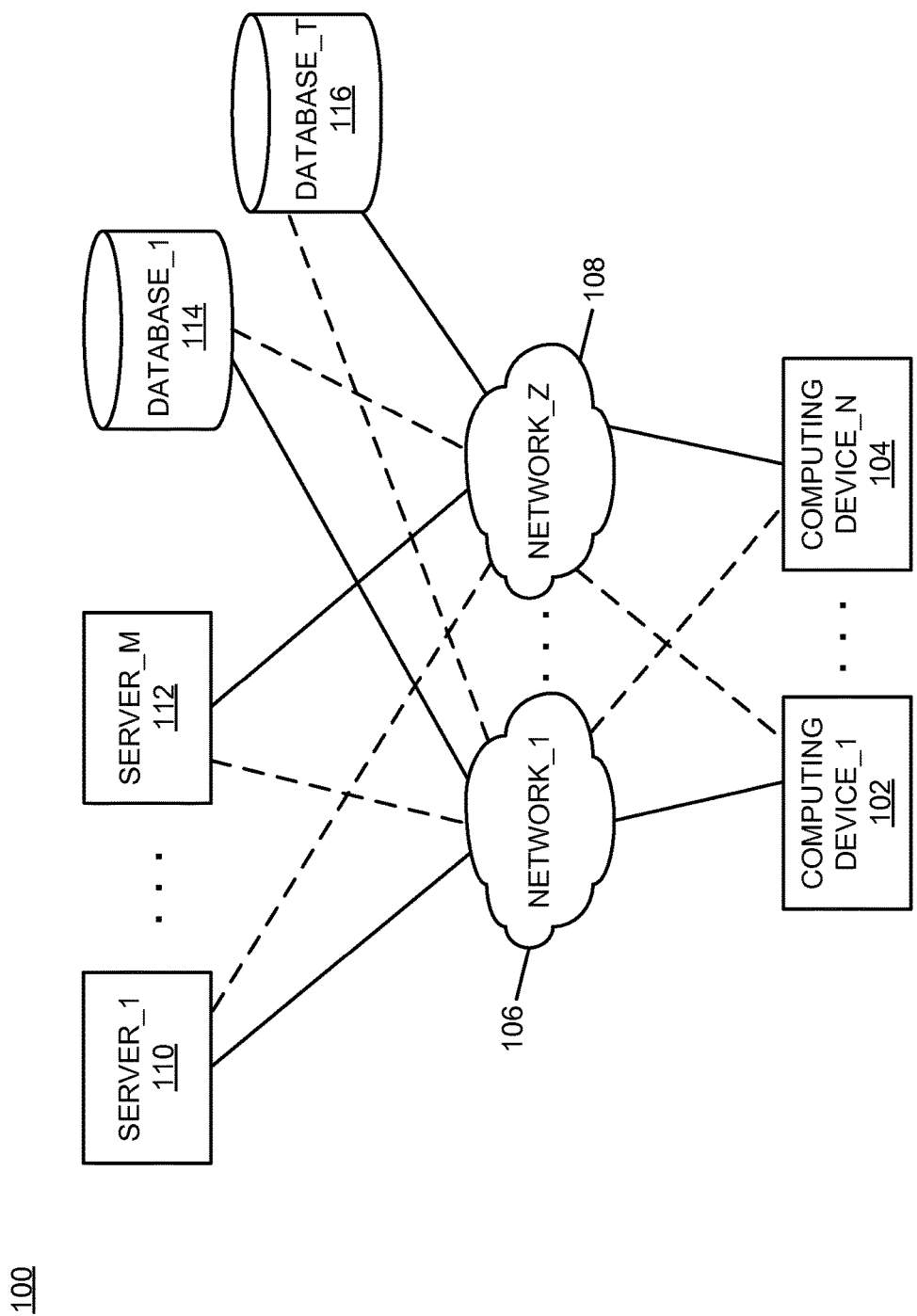
FIG. 1 is a block diagram of an example of an implementation of a system for determining connection feasibility and selection between different connection types according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides technology for determining connection feasibility and selection between different connection types. The present technology solves a recognized connectivity selection problem for applications that have access to multiple different connections and service interfaces by providing technology that includes a new form computational processing within complex computing environments that allows client devices/applications to select from the available connection types based upon measured application-accessible performance characteristics of the different available connection types in view of service-level data transmission formatting and transmission frequency of different available service interfaces. Client computing applications may perform application-level pre-testing of connections and may measure application-accessible performance characteristics to determine whether a particular combination of connection type and service interface satisfies an acceptable/threshold application-level connection performance criterion. Client applications may choose among different connection types and different service interfaces based upon the application-level connection pre-testing. As such, the present technology allows client applications to detect and reduce potential application performance issues that may result from incorrectly chosen connection types and service interfaces.

Three basic categories of physical connection options are considered available: local connections (e.g., same machine), local area network (LAN) connections, or wide area network (WAN) connections. Multiple service interface options are also considered to be available: Enterprise JavaBeans® (EJB®), simple object access protocol (SOAP) Web Service, and other types of service interfaces. For purposes of the present description, the term "connection type" refers to network-level connection options (e.g., LAN, WAN, etc.), while "service-level data transmission formatting" refers to data formatting imposed by a service for transmission of data to the service. The present technology allows a client computing device to select between different network-level connection options and different service-level data transmission formatting options (which may alternatively be considered selection of different service interfaces).

Round-trip time may be used as a rough estimate of network latency, which may help to determine whether the client and a server that hosts a service are connected via LAN or WAN. This determination of the latency for a connection type may then be used by the application to determine whether or not the configured connection type results in acceptable application-level performance within the given deployment environment based upon the service-level data transmission formatting used to interact with the service.

For example, where in-memory objects are to be transmitted to a remote device, it is noted that an Enterprise JavaBeans® (EJB®) service interface utilizes binary-based serialization of in-memory objects to binary data for transmission. In contrast, a simple object access protocol (SOAP) Web Service interface utilizes text-based serialization of in-memory objects to extensible markup language (XML) for transmission. For purposes of the description herein, binary-based serialization/de-serialization of in-memory objects to and from binary data for transmission may be considered reasonably efficient when compared with the additional computational processing serialization/de-serialization of in-memory objects to and from a text representation.

As such, given a choice between a SOAP Web Service interface and an EJB® service interface for transmission of in-memory objects, if the client and server are connected via a LAN, the EJB® service interface may be preferred because the EJB® service interface does not incur the additional computational cost of serializing of in-memory data from memory to text-based XML, and de-serializing of the data from XML at the other end of the connection into memory. However, if the client and server are connected via a WAN connection with a larger latency, a comparatively "chatty" EJB® service interface that utilizes several round trips between the client and server may lead to unacceptable performance and a "chunky" SOAP Web Service interface that bundles together several pieces of information per interaction may be preferred even in view of the serialization/de-serialization of data between memory and the text-based XML format for this type of service interface. As such, an application may change data transmission formatting (e.g., alternate between selecting binary-based serialization and text-based serialization) in accordance with whether the respective available service interface is chatty or chunky and the respective connection type (e.g., LAN, WAN, etc.).

It should be noted that in each case, the present technology differs fundamentally from network-based latency performance characterization that seeks to merely characterize a network itself where a single network protocol and/or connection type is evaluated. In contrast, the present technology operates at an application level in conjunction with applications that may have access to or may be configured with multiple different connection types and different service interfaces that may each result in different interface and performance characteristics. The present technology determines whether the performance of a given connection type and service-level data transmission format are satisfactory from an application-level perspective in view of the application-level tasks and application-level options for transferring data across a given connection type to a service (e.g., binary-based serialization and transfer versus text-based serialization and transfer). The application that is performing a particular task is the component that has sufficient information to make an informed selection among different connection types and service interfaces based upon the application-level work that is to be performed. A network-level module would not have sufficient information regarding the application-level processing task to make an informed decision with respect to connectivity and data formatting options for application-level performance and interaction with a remote service. The present technology provides connection pre-testing to satisfy application performance specifications, which is different from network-level processing and analysis of a single connection type.

It should further be noted that several options are available for implementation of the application-level pre-testing of different connection types in view of service-level data transmission formatting options. For example, if the networking code operates directly under the control of the client application (e.g., where the client has the capability of opening sockets directly, or where the client is implementing hypertext transfer protocol (HTTP) upon which communications are built), a round-trip time may be measured directly by the client application (e.g., the client may implement any round trip code appropriate to pre-test available connections). Alternatively, if the client application relies on another component (e.g., an application server) to manage connection details, the client application may attempt to open a connection on its own prior to requesting the connection from the component (e.g., it may attempt its own transmission control protocol (TCP) connection with the specified server and port, and measure the round-trip time for handshaking). As another alternative, if the client application connects via another component and application control for opening a new connection is not implemented by the application, the client application may measure the elapsed time for an initial operation (e.g., making a connection or logging in to the system) to infer latency of the connection. Additionally, where the application is a Java™ programming language application and the socket code is not available, but the application is responsible for handling TCP that is parsing HTTP messages, the Java™ programming language application may utilize TCP connectivity measurements/metrics to pre-test available connections (e.g., by using a ping and measuring timing). Further, where an application implements a higher-level protocol that may provide round-trip information (e.g., GET, PUT, POST, DELETE, etc.), the application may request a trace of communications that returns a copy of a message sent, and the time for the copy to be returned may be measured. Similarly, where an application is built on top of HTTP, a SOAP protocol layer may expose an application programming interface (API) that allows a call from the level the application, and the API may expose an interface by which to obtain connection pre-testing measurements (e.g., use the API to create a connection object and measure how long it takes to create the connection object). It should be noted that other possibilities for determining connection feasibility by measuring and pre-testing connection performance are possible, and all such possibilities are considered within the scope of the present technology.

The application-accessible performance characteristics of connection types and the application-level connection pre-testing criteria may be formalized into application-level connection pre-testing performance rules by which an application applies a configured threshold performance metric to available connection types to evaluate sufficiency of application-level performance of the respective connection types in accordance with service-level data transmission formatting options for available service interfaces. The connection pre-testing performance rules may specify which types of activities are configured for the respective client application, latency requirements/thresholds that apply to the configured activities, granularity with respect to data processing of individual tasks, and other criteria as appropriate for a given implementation.

It should be noted that while the examples herein are directed primarily to connection pre-testing in view of data transmission formatting, a frequency of interaction with a service and a magnitude of method invocations may also be used to evaluate the feasibility of the use of a particular connection type. For example, where a given client application accesses all records of a very large database, such as a disposition sweep of all customer records, and where each access is implemented using multiple method calls/invocations, then use of a wide area network (WAN) connection type may be unacceptable, use of a local area network (LAN) may be less preferred but acceptable, and use of a local connection that allows execution of the tasks at a single machine may provide the most reasonable performance. Within such a situation, a constraint may be configured for this application at the granularity of this particular activity to specify that this type of activity has a threshold time for completion of each record access and/or that the task must be performed on a same machine as the client application. These types of criteria may be specified granularly within connection pre-testing performance rules and connection pre-testing may be performed to determine whether a particular implemented/configuration provides acceptable performance.

Based upon results of the connection pre-testing, recommendations for migration of client applications or data, or use of different service interface types, may be made by the client applications where performance issues are identified and reported. As such, client applications may make their own recommendations for improved performance. Administrators may process these recommendations, and may migrate client applications and/or data, or may provide/configure different connection types and service interfaces, as appropriate for a given implementation in accordance with the client application generated recommendations.

It should further be noted that, rather than requiring each client application to implement its own checking/pre-testing separately, the functionality described herein may be implemented in a library that provides connections to client applications. Where, for example, the client is attempting to use a particular service interface that is known to perform poorly over high-latency connection types and the measured round-trip time exceeds a given threshold, then the client library may issue a warning, abort the connection, throw an exception, or take other appropriate measures to avoid use of the respective connection. As an additional extension, where a given client application is known to perform poorly over any type of remote connection, a very low latency threshold may be used to enforce a configuration with the client and server being co-located on the same machine.

It should be noted that conception of the present subject matter resulted from recognition of certain limitations associated with connection usage within complex computing environments. It was observed that within a distributed enterprise system there may be more than one option for connecting a client device to a server. For example, a server may expose multiple service interfaces, such as by providing a simple object access protocol (SOAP) service interface or a representational state transfer (REST) Web Service interface, and may also provide a native Enterprise JavaBeans® (EJB®) service interface. Each type of interface may have different performance characteristics and, as a result, it was determined that each type of interface may be appropriate for different physical network topologies, such that some types of service interfaces may be appropriate for use within a wide area network (WAN), whereas certain other types of service interfaces may be appropriate for use within a local area networks (LAN). It was further determined that in some cases, when choosing connection types or service interfaces, customers (e.g., end users) may lack the expertise to make a correct determination for their given environment, and that domain experts are often enlisted to review or propose system architectures at an additional expense. It was further determined that because each deployed environment differs, it may not be clear even to a domain expert how information within product documentation applies to a given deployment. Further, it was determined that because interconnection options may differ in different system/application deployment environments, certain connectivity options within a given environment may not provide sufficient performance to be used by a given application configuration or with a given type of service-level data transmission formatting for transmission of in-memory objects (e.g., serialization to a text-based markup language versus serialization to binary data). It was further determined that a technical solution that performs autonomous connection pre-testing performance checking may allow systems to be deployed and configured with connection and service interface configuration selections that are appropriate for the specific deployed environment. The present subject matter improves connection selection within complex computing environments by determining connection feasibility and selection between different connection types, as described above and in more detail below. As such, improved performance within complex computing environments may be obtained through use of the present technology.

The technology for determining connection feasibility and selection between different connection types described herein may be performed in real time to allow prompt determination of performance suitability of different connectivity options within a given deployment domain. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for determining connection feasibility and selection between different connection types. A computing device_1 102 through a computing device_N 104 may communicate via one or more of a network_1 106 through a network_Z 108 with several other devices. The other devices include a server_1 110 through a server_M 112, and a database_1 114 through a database_T 116.

As will be described in more detail below in association with FIG. 2 through FIG. 4, the computing device_1 102 through the computing device_N 104 may each provide automated determination of connection feasibility and selection between different connection types. The automated determination of connection feasibility and selection between different connection types is based upon client device/application pre-testing of available connections to determine suitability of a particular connection type for a particular task/activity to be performed by the computing device in accordance with different service-level data transmission formatting options of different services within a complex environment of connection possibilities. It should be noted that while the present description utilizes the client perspective for brevity and purposes of description, the applications executing at the server_1 110 through the server_M 112 may also implement the technology described herein, such as where an application server is utilized for connectivity or where external services are accessed and utilized by the respective server, or for other interconnection possibilities as appropriate for a given implementation. As such, the present technology may be implemented at a user computing device or server device level. A variety of possibilities exist for implementation of the present subject matter, and all such possibilities are considered within the scope of the present subject matter.

The network_1 106 through the network_Z 108 may include different forms of interconnection, including a private or public network such as an intranet/LAN or a WAN such as the Internet, respectively, direct inter-module interconnection, dial-up, wireless, or any other interconnection mechanism capable of interconnecting the respective devices. For purposes of the description herein, the different connection types provided by the different networks 106 through 108 may each provide different application-level performance characteristics for activities performed by the computing devices 102 through 104. As such, each computing device 102 through 104 may have access to and may select from multiple different possible connection types for performing all or a portion of the processing performed by the respective computing device or client application executed by the respective computing device. As described above and in more detail below, the computing devices 102 through 104 may pre-test available connection options provided by the different networks and may select an available connection type that performs at a threshold performance level specified for a particular activity within application-level connection pre-testing performance rules configured granularly for the particular activity.

The server_1 110 through the server_M 112 may include any device capable of providing data for consumption by a device, such as the computing device_1 102 through the computing device_N 104, via one or more networks, such as the network_1 106 through the network_Z 108. As such, the server_1 110 through the server_M 112 may each include a web server, application server, or other data server device.

The database_1 114 through the database_T 116 may each include a relational database, an object database, or any other storage type of device. As such, the database_1 114 through the database_T 116 may each be implemented differently as appropriate for a given implementation.

Figure 2:
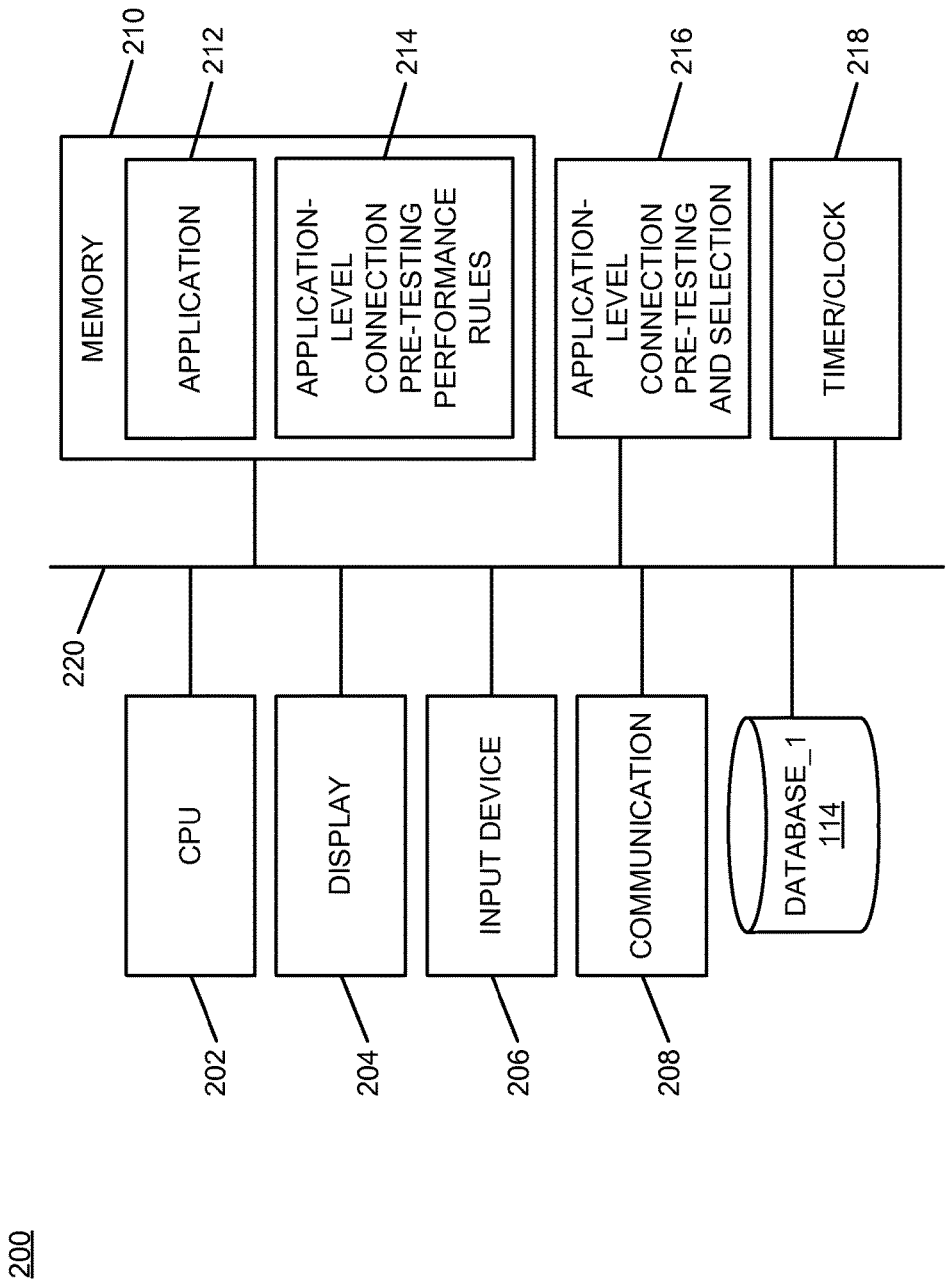
FIG. 2 is a block diagram of an example of an implementation of a core processing module capable of determining connection feasibility and selection between different connection types according to an embodiment of the present subject matter.

FIG. 2 is a block diagram of an example of an implementation of a core processing module 200 capable of determining connection feasibility and selection between different connection types. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of connection pre-testing and connection selection in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation. As such, the communication module 208 represents a communication device or interface capable of carrying out communications with other devices. The communication module 208 may provide multiple different connection types (e.g., LAN, WAN, wireless, etc.) usable by an application executed by the CPU 202, and the application may select a particular connection type based upon application-level connection pre-testing of an available connection type of the multiple different available connection types.

A memory 210 includes an application area 212 that may be used to store and execute one or more application programs within the core processing module 200. The memory 210 also includes an application-level connection pre-testing performance rules storage area 214 that stores one or more application-level connection pre-testing performance rules that may each specify granular activity-based connection selection performance criteria for one or more applications executed by the CPU 202. The application-level connection pre-testing performance rules may be specified granularly for each application, or with further granularity in accordance with one or more particular tasks performed by an application. The application-level connection pre-testing performance rules may specify associated connection and service interface selection performance criteria for each application executed by the CPU 202, and may specify these selection criteria with further granularity for one or more tasks performed by any application executed by the CPU 202.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An application-level connection pre-testing and selection module 216 is also illustrated. The application-level connection pre-testing and selection module 216 provides connection performance evaluation processing for the core processing module 200, as described above and in more detail below. The application-level connection pre-testing and selection module 216 implements the automated determination of connection feasibility and selection between different connection types of the core processing module 200.

It should also be noted that the application-level connection pre-testing and selection module 216 may form a portion of other circuitry described without departure from the scope of the present subject matter. Further, the application-level connection pre-testing and selection module 216 may alternatively be implemented as an application stored within the application area 212 of the memory 210, or may be implemented as part of one or more applications that are stored and executed within the application area 212. In such an implementation, the application-level connection pre-testing and selection module 216 may include instructions executed by the CPU 202 for performing the functionality described herein. The CPU 202 may execute these instructions to provide the processing capabilities described above and in more detail below for the core processing module 200. The application-level connection pre-testing and selection module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as for use in evaluation of connection pre-testing performance, as described above and in more detail below. As such, the application-level connection pre-testing and selection module 216 may utilize information derived from the timer/clock module 218 for information processing activities, such as determining connection feasibility and selection between different connection types as described herein.

The database_1 114 is again shown within FIG. 2 associated with the core processing module 200 to show that one or more of the database_1 114 through the database_T 116 may be migrated to operate as part of the core processing module 200, such as for example in response to a client application recommendation to migrate data for local processing. As such, the database_1 114 through the database_T 116 may be operatively coupled to the core processing module 200 without use of network connectivity, as appropriate for a given implementation.

The CPU 202, the display 204, the input device 206, the communication module 208, the memory 210, the application-level connection pre-testing and selection module 216, the timer/clock module 218, and the database_1 114 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database_1 114 is illustrated as a separate component for purposes of example, the information stored within the database_1 114 (or another database as described above) may also/alternatively be stored within the memory 210 without departure from the scope of the present subject matter. Accordingly, the core processing module 200 may take many forms and may be associated with many platforms.

Figure 3:
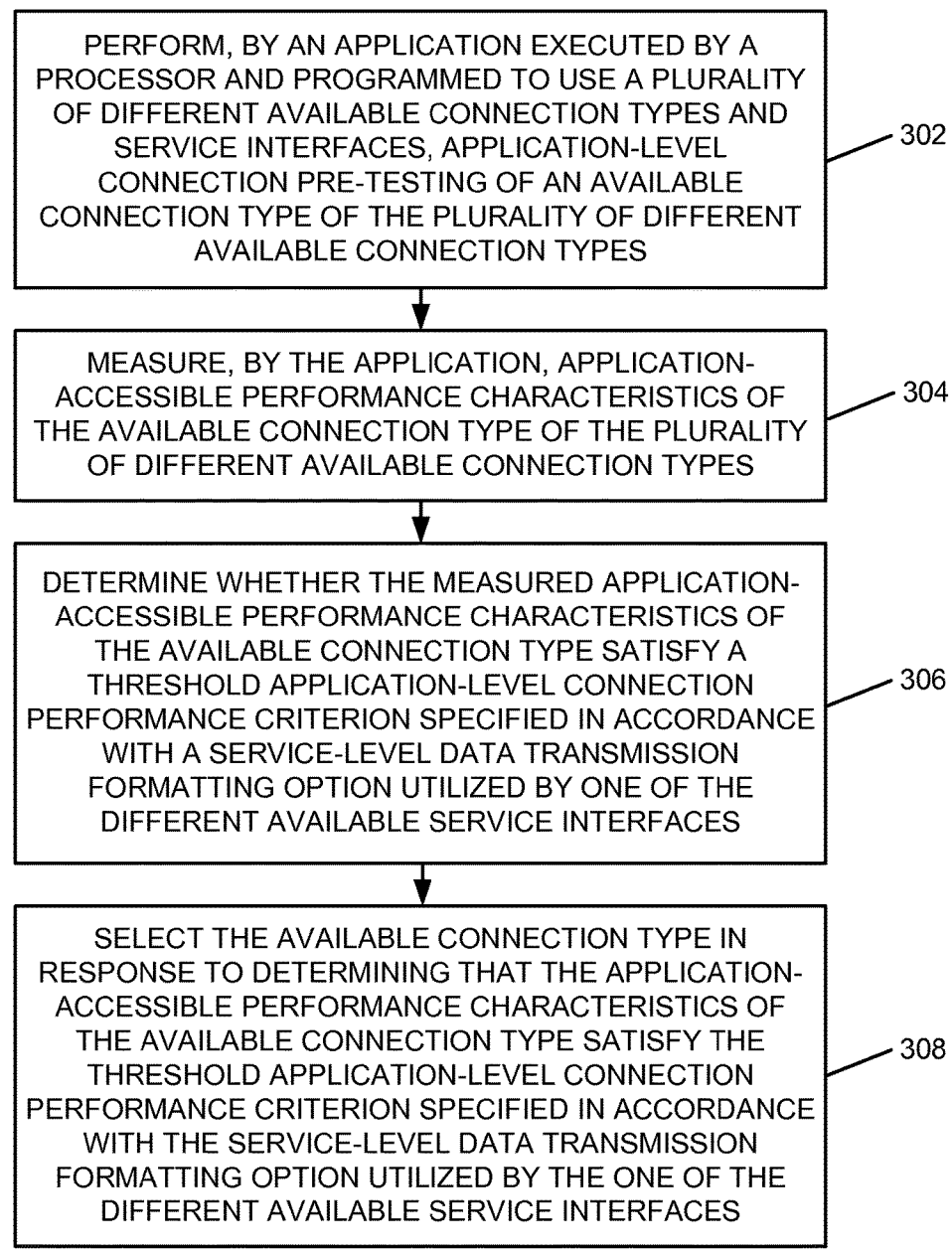
FIG. 3 is a flow chart of an example of an implementation of a process for determining connection feasibility and selection between different connection types according to an embodiment of the present subject matter.
Figure 4:
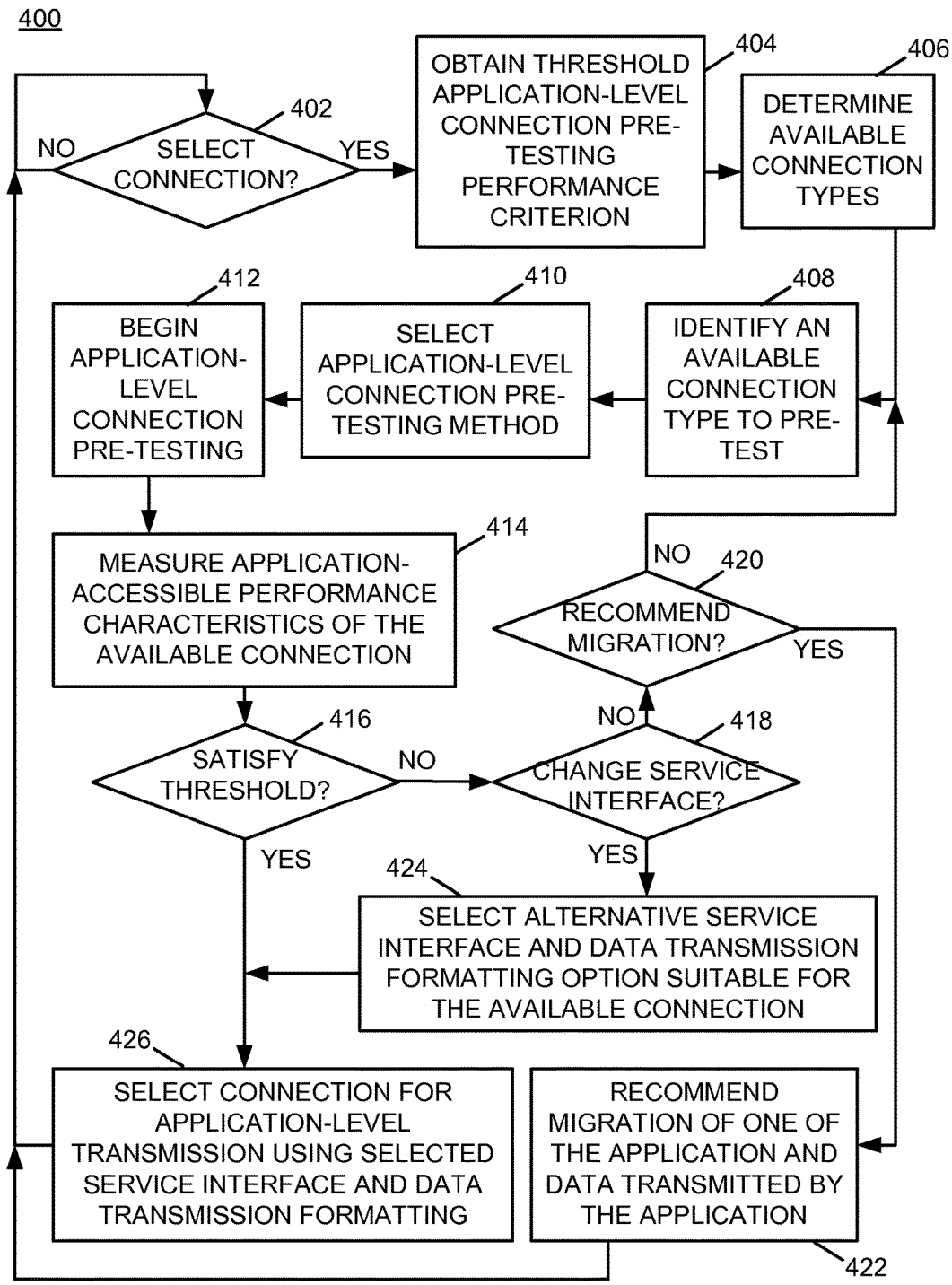
FIG. 4 is a flow chart of an example of an implementation of a process for determining connection feasibility and selection between different connection types that provides recommendations for migration of client applications or services according to an embodiment of the present subject matter.

FIG. 3 through FIG. 4 described below represent example processes that may be executed by devices, such as the core processing module 200, to perform the automated determination of connection feasibility and selection between different connection types associated with the present subject matter. Many other variations on the example processes are possible and all are considered within the scope of the present subject matter. The example processes may be performed by modules, such as the application-level connection pre-testing and selection module 216 and/or by an application executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for determining connection feasibility and selection between different connection types. The process 300 represents a computer-implemented method of performing the processing described herein. At block 302, the process 300 performs, by an application executed by a processor and programmed to use a plurality of different available connection types and service interfaces, application-level connection pre-testing of an available connection type of the plurality of different available connection types. At block 304, the process 300 measures, by the application, application-accessible performance characteristics of the available connection type of the plurality of different available connection types. At block 306, the process 300 determines whether the measured application-accessible performance characteristics of the available connection type satisfy a threshold application-level connection performance criterion specified in accordance with a service-level data transmission formatting option utilized by one of the different available service interfaces. At block 308, the process 300 selects the available connection type in response to determining that the application-accessible performance characteristics of the available connection type satisfy the threshold application-level connection performance criterion specified in accordance with the service-level data transmission formatting option utilized by the one of the different available service interfaces.

FIG. 4 is a flow chart of an example of an implementation of a process 400 for determining connection feasibility and selection between different connection types that provides recommendations for migration of client applications or services. The process 400 represents a computer-implemented method of performing the application-level selection of connections based upon application-level connection pre-testing described herein. At decision point 402, the process 400 makes a determination as to whether to select a connection for communication usage by an application. As described above, multiple physical connection types may be available. The determination at decision point 402 may be performed at startup of a client application, in association with communication activity invocation by an application, or at a time of configuring an application to run on a particular computing device. Additionally, as described above, connection pre-testing may be performed granularly per application-level communication task, may be configured for an entire application, or may additionally be configured for a set of applications as appropriate for a given implementation, and the determination to select a connection may be performed at any level of granularity appropriate for a given implementation. In response to determining at decision point 402 to select a connection for communication usage by an application, the process 400 obtains a threshold application-level connection pre-testing performance criterion at block 404. The application-level connection pre-testing performance criterion may be specified in accordance with a service-level data transmission formatting option, such as a formatting option for data selected between text-based serialized data transmission formatting (e.g., for a SOAP Web Service interface) and binary-based serialized data transmission formatting (e.g., for an EJB® service interface). Additionally, the threshold application-level connection pre-testing performance criterion may be specified granularly in accordance with a particular task performed by the application that utilizes connectivity with a remote computing device, and may be bundled with another (e.g., multiple) threshold application-level connection pre-testing performance criteria configured within an application-level connection pre-testing performance rule specified individually for the application in accordance with a communication task performed by the application.

At block 406, the process 400 determines available connection types. The available connection types may include a LAN, a WAN, a wireless connection, and other forms of connection types, as appropriate for a given implementation. At block 408, the process 400 identifies an available connection within the determined available connection types to pre-test. At block 410, the process 400 selects an application-level connection pre-testing method. As described in detail above, the selected application-level connection pre-testing method may differ based upon several factors, including whether the networking code operates directly under the control of the client application, whether the application relies on another component (e.g., an application server) to manage connection details, and other factors. The application-level connection pre-testing method may measure round-trip time, may measure elapsed time for an initial operation (e.g., making a connection or logging in to a system), may measure TCP connectivity measurements/metrics, may measure a trace of a communication that returns a copy of a message sent and the time for the copy to be returned, or may measure other forms of application-accessible performance characteristics of the available connection type. As such, an application-level connection pre-testing method appropriate for the given implementation may be selected.

At block 412, the process 400 begins application-level connection pre-testing, as described in detail above. At block 414, the process 400 measures the application-accessible performance characteristics of the available connection.

At decision point 416, the process 400 makes a determination as to whether the measured application-accessible performance characteristics of the available connection satisfy the obtained threshold application-level connection performance criterion. As noted above, the threshold application-level connection performance criterion may be specified in accordance with one of a plurality of data transmission formatting options (e.g., text-based or binary-based serialization). Affirmative processing responsive to the determination at decision point 416 will be deferred and described in more detail further below.

In response to determining at decision point 416 that the measured application-accessible performance characteristics of the available connection do not satisfy the obtained threshold application-level connection performance criterion, the process 400 makes a determination at decision point 418 as to whether to change a configured service interface option to a different service interface option suitable for the respective connection (e.g., to change between a SOAP Web Service interface that uses text-based serialization and an EJB® service interface that uses binary-based serialization). In response to determining at decision point 418 not to change the configured service interface option or that a preferred service interface and data formatting option are not presently configured for use, the process 400 makes a determination at decision point 420 as to whether to recommend migration of one of the application and data transmitted/accessed by the application (e.g., to the same machine, from a WAN-accessible server to a LAN-accessible server, etc.). In response to determining to recommend migration of one of the application and data transmitted/accessed by the application, the process 400 recommends migration of one of the application and the data transmitted/accessed by the application at block 422, and the process 400 returns to decision point 402 and iterates as described above.

Returning to the description of decision point 420, in response to determining not to recommend migration of one of the application and data transmitted/accessed by the application, the process 400 returns to block 408 to identify a different one of the available connections to pre-test, and iterates as described above.

Alternatively, and returning to the description of decision point 418, in response to determining to change the configured service interface option, the process 400 selects an alternative service interface and data transmission formatting option that is suitable for the available connection at block 424. In response to selecting the alternative service interface and data transmission formatting option that is suitable for the available connection at block 424, or returning to the description of decision point 416 and in response to determining that the measured application-accessible performance characteristics of the available connection satisfy the threshold application-level connection performance criterion, the process 400 selects the connection for the application-level transmission using the selected service interface and data transmission formatting option at block 426. Again, the selected data service-level data transmission formatting option may be selected between available options, such as text-based serialized data transmission formatting, binary-based serialized data transmission formatting, and other forms of formatting of data as appropriate for a given selected service implementation. The process 400 returns to decision point 402 and iterates as described above.

As such, the process 400 allows an executing application, such as a client application, to perform its own pre-testing of connections for suitability for application-level processing based upon the particular type of communication task being performed by the application. The process 400 also facilitates selection between different service interfaces and data transmission formatting options based upon application-level performance measurements determined by the application that is performing the particular communication task. The process 400 further facilitates reporting of application-level performance issues identified by application pre-testing of connections and recommendations of migration of the application and/or data to resolve identified application-level connection pre-testing issues.

As described above in association with FIG. 1 through FIG. 4, the example systems and processes provide technology for determining connection feasibility and selection between different connection types. Many other variations and additional activities associated with determining connection feasibility and selection between different connection types are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
by an application (i) executed by a processor and (ii) programmed as part of the application at an application level to pre-test and selectively use a plurality of different available connection types and service interfaces to communicate application-level data over one or more computer networks to a remote computing system:
   performing real-time application-level connection pre-testing of an available connection type of the plurality of different available connection types;
   measuring real-time application-accessible performance characteristics of the available connection type of the plurality of different available connection types;
   determining whether the measured real-time application-accessible performance characteristics of the available connection type satisfy a threshold real-time application-level connection performance criterion specified in accordance with a service-level data transmission formatting option utilized by one of the different available service interfaces;
   selecting the available connection type in response to determining that the measured real-time application-accessible performance characteristics of the available connection type satisfy the threshold real-time application-level connection performance criterion specified in accordance with the service-level data transmission formatting option utilized by the one of the different available service interfaces; and
   in response to determining that the measured real-time application-accessible performance characteristics of the available connection type do not satisfy the threshold real-time application-level connection performance criterion, the application:
      determining that an alternative service interface with an alternative service-level data transmission formatting option selected from a group consisting of text-based serialized data transmission formatting and binary-based serialized data transmission formatting provides satisfactory real-time application-level performance over the available connection type; and
      selecting the alternative service interface with the alternative data transmission formatting option.

2. The method of claim 1, where:
in being specified in accordance with the service-level data transmission formatting option utilized by the one of the different available service interfaces, the threshold real-time application-level connection performance criterion is specified in accordance with the service-level data transmission formatting option selected from the group consisting of the text-based serialized data transmission formatting and the binary-based serialized data transmission formatting; and
selecting the available connection type in response to determining that the measured real-time application-accessible performance characteristics of the available connection type satisfy the threshold real-time application-level connection performance criterion specified in accordance with the service-level data transmission formatting option utilized by the one of the available service interfaces comprises the application:
  selecting the available connection type in response to determining that the measured real-time application-accessible performance characteristics of the available connection type are suitable for real-time transmission of data using the service-level data transmission formatting option.

3. The method of claim 1, further comprising, in response to determining that the measured real-time application-accessible performance characteristics of the available connection type do not satisfy the threshold real-time application-level connection performance criterion, the application:
  measuring real-time application-accessible performance characteristics of an alternative available connection type of the plurality of different available connection types;
  determining whether the measured real-time application-accessible performance characteristics of the alternative available connection type satisfy the threshold real-time application-level connection performance criterion specified in accordance with the service-level data transmission formatting option utilized by the one of the different available service interfaces;
  selecting the alternative available connection type in response to determining that the measured real-time application-accessible performance characteristics of the alternative available connection type satisfy the threshold real-time application-level connection performance criterion; and
  issuing a recommendation to migrate one of the application and data processed by the application in response to determining that the measured real-time application-accessible performance characteristics of the alternative available connection type do not satisfy the threshold real-time application-level connection performance criterion.

4. The method of claim 1, where the threshold real-time application-level connection performance criterion is specified granularly in accordance with a particular task, performed by the application, that utilizes connectivity with a service hosted by the remote computing system.

5. The method of claim 1, where the threshold real-time application-level connection performance criterion comprises one of a plurality of threshold real-time application-level connection performance criteria configured within an application-level connection pre-testing performance rule specified individually for the application in accordance with one of a plurality of real-time communication tasks performed by the application.

6. The method of claim 1, where measuring the real-time application-accessible performance characteristics of the available connection type comprises one of:
  where networking code operates directly under control of the application, implementing, by the application, application-level data transmission round-trip measurement code usable to pre-test real-time round-trip data transmission performance of the available connection type, and measuring, by the application, real-time round-trip data transmission time directly at the application using the implemented application-level data transmission round-trip measurement code;
  where the application relies on another component to manage connection details, attempting to open, by the application, the available connection type prior to requesting a connection of the available connection type from the other component and measuring, by the application, a round-trip handshaking time for opening the attempted available connection type;
  where the application connects via another component and application control for opening a new connection is not implemented by the application, measuring, by the application, elapsed time for an initial login operation to the remote computing system;
  where the application is responsible for handling transmission control protocol (TCP) to parse hypertext transfer protocol (HTTP) messages, measuring, by the application, real-time TCP connectivity metrics;
  where the application implements a higher-level protocol that provides real-time round-trip data transmission information, requesting, by the application, a trace of communications that returns a copy of a message sent, and measuring, by the application, a time for the copy of the message to be returned to the application; or
  where an object access protocol layer that supports communications implements an application programming interface (API) that allows a call from the application, using, by the application, the API to create a connection object and measuring, by the application, a duration of time for the API to acknowledge creation of the connection object.

7. A system, comprising:
a communication interface that provides access to a plurality of different available connection types and service interfaces; and
a processor programmed to execute an application programmed as part of the application at an application level to pre-test and selectively use, via the communication interface, the plurality of different available connection types and service interfaces to communicate application-level data over one or more computer networks to a remote computing system, the application being programmed when executed by the processor to:
  perform real-time application-level connection pre-testing of an available connection type of the plurality of different available connection types;
  measure real-time application-accessible performance characteristics of the available connection type of the plurality of different available connection types;
  determine whether the measured real-time application-accessible performance characteristics of the available connection type satisfy a threshold real-time application-level connection performance criterion specified in accordance a service-level data transmission formatting option utilized by one of the different available service interfaces;
  select the available connection type in response to determining that the measured real-time application-accessible performance characteristics of the available connection type satisfy the threshold real-time application-level connection performance criterion specified in accordance with the service-level data transmission formatting option utilized by the one of the different available service interfaces; and
  in response to determining that the measured real-time application-accessible performance characteristics of the available connection type do not satisfy the threshold real-time application-level connection performance criterion, the application when executed by the processor is further programmed to:
    determine that an alternative service interface with an alternative service-level data transmission formatting option selected from a group consisting of text-based serialized data transmission formatting and binary-based serialized data transmission formatting provides satisfactory real-time application-level performance over the available connection type; and select the alternative service interface with the alternative data transmission formatting option.

8. The system of claim 7, where:

in being specified in accordance with the service-level data transmission formatting option utilized by the one of the different available service interfaces, the threshold real-time application-level connection performance criterion is specified in accordance with the service-level data transmission formatting option selected from the group consisting of the text-based serialized data transmission formatting and the binary-based serialized data transmission formatting; and in being programmed to select the available connection type in response to determining that the measured real-time application-accessible performance characteristics of the available connection type satisfy the threshold real-time application-level connection performance criterion specified in accordance with the service-level data transmission formatting option utilized by the one of the available service interfaces, the application when executed by the processor is programmed to:

select the available connection type in response to determining that the measured real-time application-accessible performance characteristics of the available connection type are suitable for real-time transmission of data using the service-level data transmission formatting option.

9. The system of claim 7, where the application when executed by the processor is further programmed to, in response to determining that the measured real-time application-accessible performance characteristics of the available connection type do not satisfy the threshold real-time application-level connection performance criterion:

measure real-time application-accessible performance characteristics of an alternative available connection type of the plurality of different available connection types;

determine whether the measured real-time application-accessible performance characteristics of the alternative available connection type satisfy the threshold real-time application-level connection performance criterion specified in accordance with the service-level data transmission formatting option utilized by the one of the different available service interfaces;

select the alternative available connection type in response to determining that the measured real-time application-accessible performance characteristics of the alternative available connection type satisfy the threshold real-time application-level connection performance criterion; and issue a recommendation to migrate one of the application and data processed by the application in response to determining that the measured real-time application-accessible performance characteristics of the alternative available connection type do not satisfy the threshold real-time application-level connection performance criterion.

10. The system of claim 7, where the threshold real-time application-level connection performance criterion is specified granularly in accordance with a particular task, performed by the application, that utilizes connectivity with a service hosted by the remote computing system.

11. The system of claim 7, where the threshold real-time application-level connection performance criterion comprises one of a plurality of threshold real-time application-level connection performance criteria configured within an application-level connection pre-testing performance rule specified individually for the application in accordance with one of a plurality of real-time communication tasks performed by the application.

12. A computer program product, comprising:

a computer readable storage medium having computer readable program code embodied therewith, where the computer readable storage medium is not a transitory signal per se, and where the computer readable program code when executed on a computer causes the computer to:

execute an application programmed as part of the application at an application level to pre-test and selectively use a plurality of different available connection types and service interfaces to communicate application-level data over one or more computer networks to a remote computing system, and to:

perform real-time application-level connection pre-testing of an available connection type of the plurality of different available connection types;

measure real-time application-accessible performance characteristics of the available connection type of the plurality of different available connection types;

determine whether the measured real-time application-accessible performance characteristics of the available connection type satisfy a threshold real-time application-level connection performance criterion specified in accordance with a service-level data transmission formatting option utilized by one of the different available service interfaces;

select the available connection type in response to determining that the measured real-time application-accessible performance characteristics of the available connection type satisfy the threshold real-time application-level connection performance criterion specified in accordance with the service-level data transmission formatting option utilized by the one of the different available service interfaces; and in response to determining that the measured real-time application-accessible performance characteristics of the available connection type do not satisfy the threshold real-time application-level connection performance criterion, the computer readable program code when executed on the computer further causes the computer to execute the application to:

determine that an alternative service interface with an alternative service-level data transmission formatting option selected from a group consisting of text-based serialized data transmission formatting and binary-based serialized data transmission formatting provides satisfactory real-time application-level performance over the available connection type; and select the alternative service interface with the alternative data transmission formatting option.

13. The computer program product of claim 12, where:

in being specified in accordance with the service-level data transmission formatting option utilized by the one of the different available service interfaces, the threshold real-time application-level connection performance criterion is specified in accordance with the service-level data transmission formatting option selected from the group consisting of the text-based serialized data transmission formatting and the binary-based serialized data transmission formatting; and in causing the computer to execute the application to select the available connection type in response to determining that the measured real-time application-accessible performance characteristics of the available connection type satisfy the threshold real-time application-level connection performance criterion specified in accordance with the service-level data transmission formatting option utilized by the one of the available service interfaces, the computer readable program code when executed on the computer causes the computer to execute the application to:

select the available connection type in response to determining that the measured real-time application-accessible performance characteristics of the available connection type are suitable for real-time transmission of data using the service-level data transmission formatting option.

14. The computer program product of claim 12, where the computer readable program code when executed on the computer further causes the computer to execute the application to, in response to determining that the measured real-time application-accessible performance characteristics of the available connection type do not satisfy the threshold real-time application-level connection performance criterion:

measure real-time application-accessible performance characteristics of an alternative available connection type of the plurality of different available connection types;

determine whether the measured real-time application-accessible performance characteristics of the alternative available connection type satisfy the threshold real-time application-level connection performance criterion specified in accordance with the service-level data transmission formatting option utilized by the one of the different available service interfaces;

select the alternative available connection type in response to determining that the measured real-time application-accessible performance characteristics of the alternative available connection type satisfy the threshold real-time application-level connection performance criterion; and issue a recommendation to migrate one of the application and data processed by the application in response to determining that the measured real-time application-accessible performance characteristics of the alternative available connection type do not satisfy the threshold real-time application-level connection performance criterion.

15. The computer program product of claim 12, where the threshold real-time application-level connection performance criterion is specified granularly in accordance with a particular task, performed by the application, that utilizes connectivity with a service hosted by the remote computing system.

16. The computer program product of claim 12, where the threshold real-time application-level connection performance criterion comprises one of a plurality of threshold real-time application-level connection performance criteria configured within an application-level connection pre-testing performance rule specified individually for the application in accordance with one of a plurality of real-time communication tasks performed by the application.

17. The computer program product of claim 12, where in causing the computer to execute the application to measure the real-time application-accessible performance characteristics of the available connection type, the computer readable program code when executed on the computer causes the computer to one of:

where networking code operates directly under control of the application, implement, by the application, application-level data transmission round-trip measurement code usable to pre-test real-time round-trip data transmission performance of the available connection type, and measure, by the application, real-time round-trip data transmission time directly at the application using the implemented application-level data transmission round-trip measurement code;

where the application relies on another component to manage connection details, attempt to open, by the application, the available connection type prior to requesting a connection of the available connection type from the other component and measure, by the application, a round-trip handshaking time for opening the attempted available connection type;

where the application connects via another component and application control for opening a new connection is not implemented by the application, measure, by the application, elapsed time for an initial login operation to the remote computing system;

where the application is responsible for handling transmission control protocol (TCP) to parse hypertext transfer protocol (HTTP) messages, measure, by the application, real-time TCP connectivity metrics;

where the application implements a higher-level protocol that provides real-time round-trip data transmission information, request, by the application, a trace of communications that returns a copy of a message sent, and measure, by the application, a time for the copy of the message to be returned to the application; or where an object access protocol layer that supports communications implements an application programming interface (API) that allows a call from the application, use, by the application, the API to create a connection object and measure, by the application, a duration of time for the API to acknowledge creation of the connection object.

18. The system of claim 7, where in being programmed to execute the application to measure the real-time application-accessible performance characteristics of the available connection type, the application when executed by the processor is programmed to one of:

where networking code operates directly under control of the application, implement, by the application, application-level data transmission round-trip measurement code usable to pre-test real-time round-trip data transmission performance of the available connection type, and measure, by the application, real-time round-trip data transmission time directly at the application using the implemented application-level data transmission round-trip measurement code;

where the application relies on another component to manage connection details, attempt to open, by the application, the available connection type prior to requesting a connection of the available connection type from the other component and measure, by the application, a round-trip handshaking time for opening the attempted available connection type;

where the application connects via another component and application control for opening a new connection is not implemented by the application, measure, by the application, elapsed time for an initial login operation to the remote computing system;

where the application is responsible for handling transmission control protocol (TCP) to parse hypertext transfer protocol (HTTP) messages, measure, by the application, real-time TCP connectivity metrics;

where the application implements a higher-level protocol that provides real-time round-trip data transmission information, request, by the application, a trace of communications that returns a copy of a message sent, and measure, by the application, a time for the copy of the message to be returned to the application; or where an object access protocol layer that supports communications implements an application programming interface (API) that allows a call from the application, use, by the application, the API to create a connection object and measure, by the application, a duration of time for the API to acknowledge creation of the connection object.

* * * * *